Oct. 15, 1968     E. L. PARR     3,405,751
ELEMENT HAVING CONTINUOUS THREAD, PORTION OF THREAD
BEING LONGITUDINALLY VARIABLE IN LENGTH
Filed July 15, 1966     2 Sheets-Sheet 1

INVENTOR.
EDWARD L. PARR
BY
ATTORNEYS

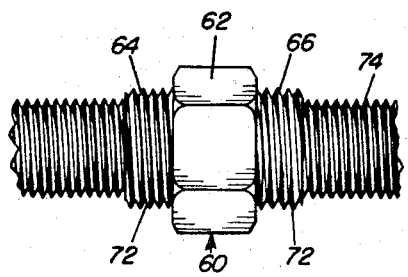
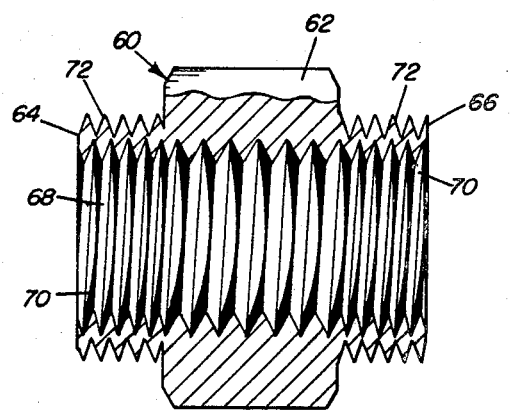
Fig.7
Fig.8
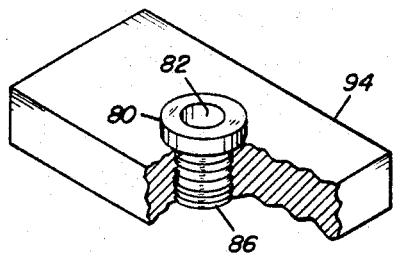
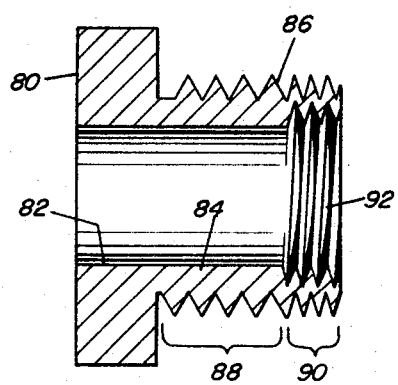
Fig.9
Fig.10
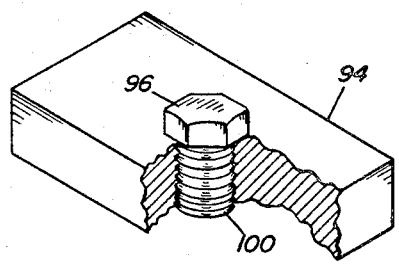
Fig.11
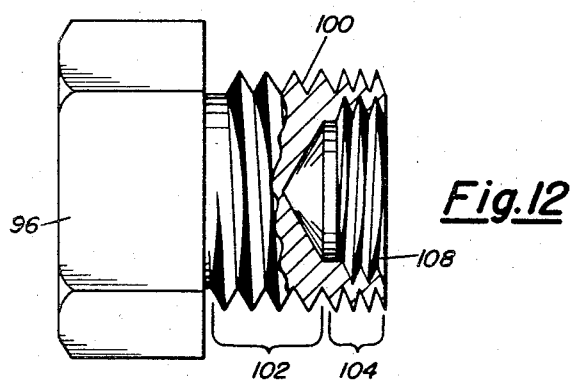
Fig.12
INVENTOR.
EDWARD L. PARR
BY
ATTORNEYS United States Patent Office 3,405,751
Patented Oct. 15, 1968

3,405,751
ELEMENT HAVING CONTINUOUS THREAD, POR-
TION OF THREAD BEING LONGITUDINALLY
VARIABLE IN LENGTH
Edward L. Parr, El Cajon, Calif., assignor to
Wendell L. Thompson, Burbank, Calif.
Filed July 15, 1966, Ser. No. 565,424
4 Claims. (Cl. 151—14)

ABSTRACT OF THE DISCLOSURE

A threaded element such as a screw, nut, bushing, or plug including two longitudinally adjoining and integral portions, one of which is threaded externally and internally with like number of thread per equal length to thereby form that portion into an axially yieldable, variable length, bellows-like portion, the thread on the other portion being a continuation of either the external or internal threads of the first mentioned portion, but the number of turns of the thread on the second mentioned portion being different, per equal length, than those of the first mentioned portion of which it is a continuation.

BACKGROUND OF THE INVENTION

Field of the invention

The element of the present invention is suitable for many purposes such as for bolts or screws and nuts, either of which in conjunction with a standard type nut or standard type screw, respectively, forms a self locking combination. The word "screw" herein also comprehends other threaded elements, such as bolts, etc.

An element of the present invention is suitable as a chased nut for a lead screw, as for example, a chased nut for a lead screw of a lathe. An element of the present invention is suitable as a bushing. Also, an element of the present invention is suitable as a plug.

DESCRIPTION OF THE PRIOR ART

The prior art such as that shown in the McKay et al. Patent No. 3,212,547 and the Mount Patent No. 3,227,199, increased the outside diameter of a portion of the threaded nut, in attempting to form self locking screws, by applying pressure to a selected section of the wall of a bore in the screw, to thereby increase the outside diameter of a section of the screw.

The prior art such as that disclosed in Wootton, Patent No. 3,141,488, employes a detent 35 for effecting an inward displacement of internal threads, as distinguished from axial displacement. The Harvey Patent No. 197,467, and the Stanford Patent No. 1,367,168, disclose merely bolt or nut threads, the turns of which gradually vary in pitch.

SUMMARY OF THE INVENTION

In practicing the present invention, each of the elements is provided, at least throughout a section thereof, with both external and internal threads. These threads can be simultaneously formed by utilizing the standard thread rolling apparatus. When a chased nut is to be formed, both threads extend throughout the axial length of the nut to thereby form an axially yieldable, variable in length, bellows-like element. When the element is to be used as a self locking nut or a self locking screw, or used as a bushing or as a plug, a portion of the threaded section is either axially compressed or axially extended relative to a contingent longitudinally extending portion.

Elements of the present invention can be formed by modified rolling apparatus capable of rolling a portion of both threaded sections with a different pitch than the contingent longitudinal extending portions, whereby the number of turns for a given length of one portion of the element will differ from the number of turns of equal length of the contingent longitudinally extending portions.

It will be understood that the chased nut can be molded with both external and internal threads of like number of turns per equal length throughout the entire length thereof to thereby form a nut which is axially variable in length. It is also to be understood that a self locking element can be molded in such form so that a portion thereof has like pitch threads and the contingent longitudinally extending portion has different pitch threads.

Other features and the advantages of the present invention will be apparent from the following description, reference being had to the accompanying drawings wherein a preferred embodiment of the invention is illustrated.

BRIEF DESCRIPTION OF DRAWINGS

FIG. 7 is a side view of a chased nut applied to the lead screw of a lathe or the like;

FIG. 8 is a cross sectional view of the chased nut prior to being compressed;

FIG. 9 is a fragmentary view of a casting shown partly in section and showing the element of the present invention in the form of a bushing;

FIG. 10 is a sectional view of the bushing shown in FIG. 9 but on a larger scale;

FIG. 11 is a view similar to FIG. 9 but showing the element of the present invention in the form of a nut; and FIG. 12 is a view partly in section showing the plug illustrated in FIG. 11, but on a larger scale.

DETAILED DESCRIPTION OF PREFERRED EMBODIMENTS

Figure 1:
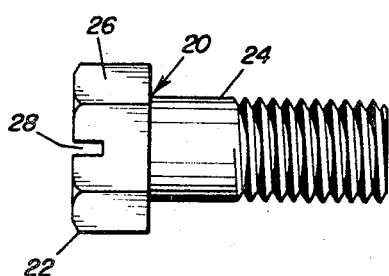
FIG. 1 is a side view of a bolt made in accordance with the present invention.
Figure 2:
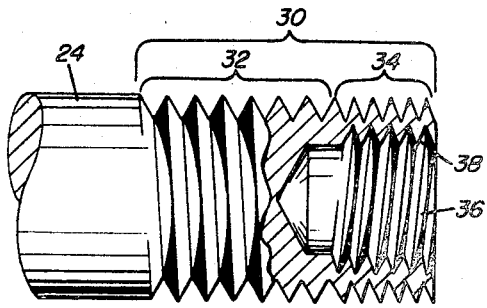
FIG. 2 is a fragmentary view of the bolt shown in FIG. 1, but on a large scale, and showing the end of the bolt as having more turns of that end, per equal length, from that of the contingent, longitudinally extending portion.

Referring more in detail to the drawings, and more particularly to FIGS. 1 and 2, the element of the present invention is in the form of a bolt 20 that includes a head 22 and a shank 24. The head is provided with the usual lands 26 for turning the same by a wrench and is also provided with a slot 28 for a screwdriver so that it can also function as a screw.

Referring more in detail to FIG. 2, it will be seen that the screw is provided with a continuous external thread section indicated by the numeral 30. This section includes a portion 32 and a portion 34. The portion 34 is provided with more turns per given length than the portion 32. The end of the screw is bored as at 36 and it is provided with internal turns 38, which complement the turns in the portion 34, i.e., the external and internal threads are in phase in that the crests and roots of the turns of one thread opposes the roots and crests of the turns of the other thread. Thus, the portion 34 is in the form of an axially yieldable, bellows-like portion.

Figure 3:
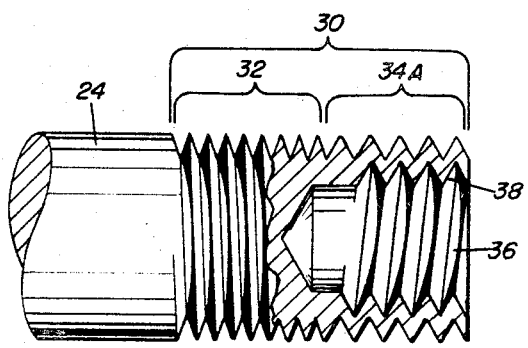
FIG. 3 is a view similar to FIG. 2, but showing the end of the bolt as having a lesser number of turns, per equal length of the remaining portion of the bolt.

Referring to the embodiment shown in FIG. 3, it will be observed that the portion 34A is provided with a lesser number of turns per given length than the turns in portion 32.

Figure 5:
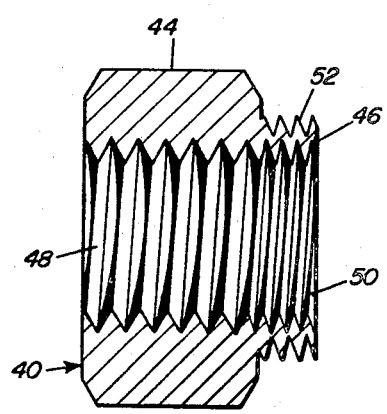
FIG. 5 is a cross sectional view of the bolt shown in FIG. 4, but showing a portion of the nut as having more turns per equal length than the remaining portion of the nut.
Figure 4:
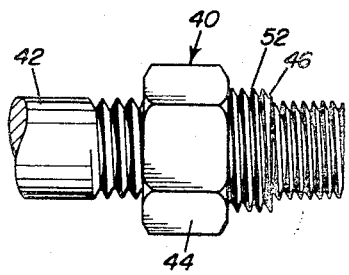
FIG. 4 is a side view of a nut made in accordance with the present invention, showing the same attached to a bolt.
Figure 6:
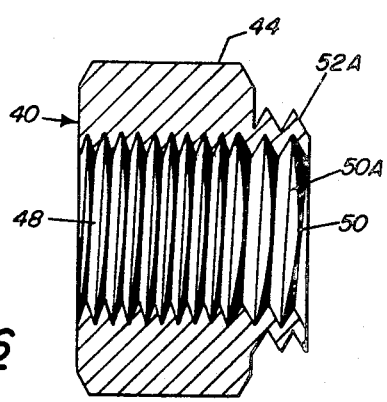
FIG. 6 is a view similar to FIG. 5 but showing one portion of the nut having a lesser number of turns per equal length than other portions of the nut.

Referring now to the embodiment shown in FIGS. 4 and 5, the element is shown in the form of a nut 40 for receiving a screw 42 as is more clearly shown in FIG. 5, the nut 40 is provided with a wrench portion 44 and a concentric extension 46. The nut is provided with a continuous thread throughout the length thereof including the portion 48 in the wrench portion and the internal threads 50 in the extension 46. The extension is also threaded externally as at 52. The turns in internal thread portion 50 and turns in the external thread portion 52 complement one another in number. The turns 50 and 52 are more in number, per given length, than the turns of thread 48 in the wrench portion 44. The turns 50A and 52A, in the embodiment shown in FIG. 6, complement one another in number and are more in number, per given length, than the turns of thread 48.

Referring now to the embodiment shown in FIGS. 7 and 8, the nut 60 is provided with a wrench portion 62 and two extending portions 64 and 66 on opposite sides thereof. The nut 60 is provided with a continuous thread 68 throughout the wrench portion 62 and the portions 70 in the extensions 64 and 66. The extensions 64 and 66 are also externally threaded as at 72, the external threads 72 complementing in turns, the number of turns in the internal portion 70. As in FIGS. 5 and 6, the extensions can be expanded axially or compressed axially so as to vary in number of turns of threads relative to the number of turns per given length in the portion 68. They are shown compressed in FIG. 8.

When the screw or bolt is formed of certain metals, such as stainless steel, the portion 34 or portion 46, upon being compressed or the portion 34A or portion 46, upon being expanded, yieldingly retains, respectively, the compressed or expanded, position, referred to herein as a "static" position. However, when, for example, a nut having a standard gauge thread is applied to the screw 20, or a screw having a standard gauge thread is applied to the nut 40, the positions 34 of the screw of the portions of the extension 46 of the nut 40, will yield axially, but only to a limited extent whereby upon screwing one onto the other, binding, i.e., locking relationship, is established between the respective screw and nut. Thus, the portions 34 of the screw 20 and the portion 46 of the nut each form an axially yieldable, variable in length, bellows-like portion.

When a nut such as 60 is desirable, as for example, as a chased nut which co-operates with a lead screw on a lathe, the nut is tempered to permanently retain resiliency or elasticity, i.e., it tends to resiliently or elastically retain its portions 64 and 66 in its compressed or expanded, as the case may be, position, thereby retaining, constantly, frictional relationship between it and the screw. Thus, backlash is eliminated entirely between the nut which carries, for example, the cutting tool of the lathe, and the lead screw. The lead screw is shown at 74.

It will be observed from FIGS. 9 and 10 that the element can also be used as a bushing 80, similar to a hollow bolt, which can function as a circular bearing surface. In that embodiment, part of the bushing includes a non-threaded internal section 82. The shank 84 is provided with a continuous, externally threaded section 86, divided into two portions 88 and 90. The portion 90 is internally threaded also, as at 92. The turns in the section 88 complement the turns in the thread in the casting 94, while the turns in the portion 90, before being inserted in the casting, differ in number per given length than the turns in the portion 88. The external turns in the portion 90 complement in number the internal threads 92.

As seen in FIGS. 11 and 12, the element is in the form of a plug 96 in a casting 98. The plug is provided with a continuous, externally threaded section 100 having portions 102 and 104. The number of threads in the portion 102, complements the number of turns in the threads in the casting, while the number of threads in the portion 104 differ, per given length, than the number of turns in the portion 102. The end of the plug is bored and internally threaded as at 108, inwardly of the threaded portion 104. The turns in the threads 104 and 108 complement one another in number.

When the bushing 80 and the plug 96 are driven home, binding relationships are established and maintained in the respective castings.

From the foregoing, it is readily apparent that I have provided inexpensive, reliable, and sturdy self locking screws, bushings, plugs and nuts, and I have also provided a chased nut of simple construction which assures elimination of back-lash. It is to be understood that the wall thickness of the hollow portions, for example, portion 34, is sufficiently thin that it can be expanded and contracted similar to a metallic bellows.

While the forms of embodiment herein shown and described constitute preferred forms, it is to be understood that other forms may be adopted falling within the scope of the claims that follow.

I claim:
1. An elongated element having an axial bore extending inwardly from one end thereof, a longitudinally extending portion of said element threaded continuously externally and continuously internally, said threads being of uniform pitch throughout substantially the entire extent of said portion, the crests and roots of the turns of one of the threads opposing the respective roots and crests of the other thread, and the number of turns of said one thread being the same per equal length as that of said other thread, the wall thickness between said threads being sufficiently thin so that it can be expanded and contracted, forming said portion into an axially yieldable, variable in length, bellows-like portion, said element also having an adjoining and integral, longitudinally extending portion having threads of uniform pitch in continuity with one of the threads of the first mentioned portion, the number of threads of the second mentioned portion being different, per equal length, than the number of turns of the first mentioned portion with which it is in continuity, the major and minor diameters of said threaded portions in continuity being uniform and equal throughout said portions.

2. An elastic element as defined in claim 1, characterized in that said element is in the form of a chased nut for use on a lead screw for a lathe or the like.

3. An element as defined in claim 1, characterized in that the element is in the form of a nut.

4. An element as defined in claim 1, characterized in that the element includes:
  (A) A section capable of being turned by a tool, such as a wrench or screw driver.

References Cited
UNITED STATES PATENTS

| | | | |
|---|---|---|---|
| 197,467 | 11/1877 | Harvey | 151—22 |
| 932,395 | 8/1909 | Kenney | 151—14 |
| 1,367,168 | 2/1921 | Stanford | 151—22 |
| 2,636,194 | 4/1953 | Schneider | 151—14 |
| 3,141,488 | 7/1964 | Wootton | 151—21 |
| 2,383,231 | 8/1945 | Anderton | 151—14 |

CARL W. TOMLIN, *Primary Examiner.*

RAMON S. BRITTS, *Assistant Examiner.*